Nov. 28, 1961 M. GLICKSMAN 3,011,070

HALL-EFFECT-TYPE DEVICE WITH REVERSAL OF SIGN OF HALL-EFFECT VOLTAGE

Filed April 18, 1958 4 Sheets-Sheet 1

INVENTOR.
MAURICE GLICKSMAN
BY
Edward J. Norton
ATTORNEY

INVENTOR.
MAURICE GLICKSMAN
BY
Edward J Norton
ATTORNEY

INVENTOR.
MAURICE GLICKSMAN
BY Edward J. Norton
ATTORNEY

INVENTOR.
MAURICE GLICKSMAN
BY Edward J. Norton
ATTORNEY 3,011,070

HALL-EFFECT-TYPE DEVICE WITH REVERSAL OF SIGN OF HALL-EFFECT VOLTAGE

Maurice Glicksman, Princeton, N.J., assignor to Radio Corporation of America, a corporation of Delaware Filed Apr. 18, 1958, Ser. No. 729,449
10 Claims. (Cl. 307—88.5)

The invention relates to frequency multiplier circuit arrangements. Particularly, the invention relates to a frequency multiplier circuit arrangement in which a body of semiconductor material is so arranged and energized as to perform the frequency multiplication function.

A general object of the invention is to provide an improved frequency multiplier using a body of semiconductor material.

Another object is to provide a novel frequency multiplier by controlling the concentration of electric charge carriers in a body of semiconductor material.

A further object is to provide an improved frequency multiplier using a body of semiconductor material to translate a signal of any given frequency in a range of frequencies into an output signal of the given frequency multiplied by a desired factor, without requiring a retuning of the frequency multiplier upon a change in the frequency of the input signal.

A still further object is to provide a novel semiconductor circuit arrangement to produce an output signal of a frequency which is the sum of one input signal frequency and twice a second input frequency.

A still further object is to provide an improved frequency multiplier which is simple in operation and in construction, requiring a minimum number of parts.

Semiconductor materials are known which have a property such that an electrical potential is produced at laterally spaced points along one axis of the material when a current is passed through an orthogonal axis thereof under the influence of a mutually orthogonal magnetic field. This electrical property of these materials has become known as the Hall effect. The output or Hall voltage produced as a result of the Hall effect is generally proportional to the product of the magnetic field strength and the intensity of the current passed through the body of semiconductor material or Hall effect element.

It is believed that current flow takes place through a semiconductor material due to the presence therein of mobile electric charge carriers. The conduction phenomenon, it is believed, occurs as a result of a stream of mobile negative and/or positive carriers which correspond respectively to a stream of electrons and electron vacancies defined as holes in the semiconductor material.

The invention utilizes a body of semiconductor material exhibiting a characteristic dependence of the Hall voltage on an applied electric field and magnetild field. The semiconductor material is one in which both mobile electrons and holes are present.

Examples of materials which may be used are indium antimonide and indium arsenide. Other suitable materials are available. The production of materials having the above-mentioned characteristics is known and reference thereto may be found in the art. The present invention is not limited to the use of any particular material and is not concerned per se with the actual production of such materials.

Upon the application of an electric field to a semiconductor material maintained in a magnetic field, the charge carriers therein acquire a net velocity (drift velocity) in the direction of the electric field given by the mobility times the applied electric field. The electron and hole mobilities are, therefore, equal to the net velocity thereof over the applied electric field. A semiconductor material is selected, such as one of the materials given by way of example above, that exhibits a mobility ratio (ratio of electron mobility to hole mobility) different from one. Assuming for the moment that a semiconductor material having a mobility ratio greater than one (the electron mobility is greater than the hole mobility) is selected, the semiconductor body is arranged by temperature control, doping or other known methods to have a larger concentration of holes than electrons. In this condition, the electron concentration times the square of the mobility ratio is less than the hole concentration. Means are provided according to the invention to produce electron-hole pairs in the semiconductor body such that the number of holes and the number of electrons increase in equal amounts.

Because of the disparity between the electron mobility and hole mobility, a point in time will be reached as an increasingly larger number of electron-hole pairs are produced at which the electron concentration times the square of the mobility ratio exceeds the hole concentration. By varying the production of electron-hole pairs at a given frequency or rate, the Hall voltage or output signal changes sign in one direction as the number of electron-hole pairs produced is increased and in the reverse direction as the number of electron-hole pairs produced is decreased. This action results in the production of an output signal represented by the Hall voltage having a frequency equal to the given frequency multiplied by a given factor.

If a semiconductor material is selected having a mobility ratio less than one (the electron mobility is less than the hole mobility), the semiconductor material is arranged to have a larger concentration of electrons than of holes. The resulting operation will be as described above except that the output signal will be one-hundred and eighty degrees out of phase with the output signal produced using a material in which the mobility ratio is greater than one.

A frequency multiplier is disclosed which functions without tuned circuits and similar additional circuitry required in known frequency multiplier circuit arrangements. In one embodiment, a circuit arrangement is provided for producing an output signal of a frequency equal to the sum of a first input frequency and twice a second input frequency.

A more detailed description of the invention will now be given in connection with the accompanying drawing in which.

Figure 1:
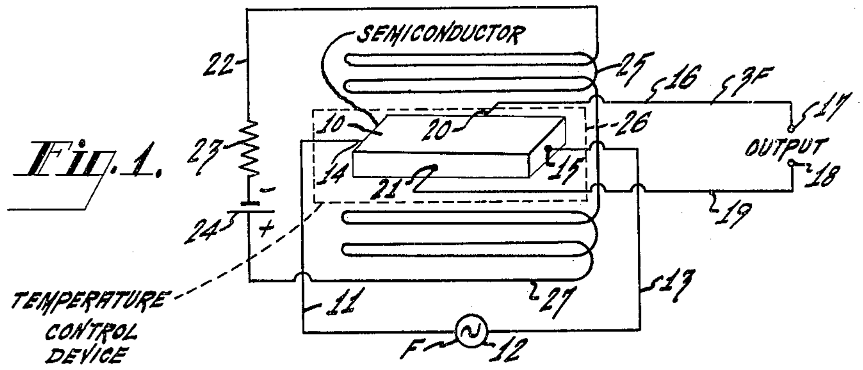
FIGURE 1 is a circuit diagram of one embodiment of a frequency multiplier constructed according to the invention.

In the embodiment of the invention shown in FIGURE 1 there is provided a body (or crystal) 10 constructed of a material capable of operation as a Hall effect element. Particularly, the body 10 is constructed of a material which exhibits a characteristic dependence of the Hall voltage on an applied electric and magnetic field. A semiconductor material such as indium antimonide and indium arsenide may be used in which both electrons and holes (electron vacancies) contribute to the conduction.

The body 10 may be of any size and shape according to the requirements of a particular application. While the body 10 is shown and will be described as being rectangular in shape, it is to be understood that the body 10 may be of any other suitable shape as, for example, a disc. By way of example only, the body 10 may be two millimeters wide by one millimeter deep and one centimeter (or ten millimeters) in length. The size will depend on the shape of the body 10, the material used, and so on.

A first electrical path including lead 11, a source 12 of an alternating current signal of frequency F and a lead 13 is connected across one axis of the body 10. The leads 11 and 13 are connected to opposite ends of the body 10 at points 14, 15 located along the long dimension or longitudinal axis thereof by any of known techniques. The connections to the points 14, 15 may be made, for example, by soldering to the body 10 or to deposited metal coatings on the body 10. A second electrical path or output circuit including lead 16, terminals 17 and 18 and lead 19 is connected across the width of the body 10 at right angles to the first electrical path defined above. The leads 16, 19 may be connected to the body 10 at points 20, 21 by the same techniques used to connect leads 11 and 13 to the body 10.

A third electrical path includes lead 22, resistor 23, a source of unidirectional potential represented by a battery 24, lead 27 and an inductance or winding 25. The body 10 is located by any suitable means within the turns of the winding 25 so that the body 10 is located in a magnetic field having a direction at right angles to both the first and second electrical paths defined above. While a winding 25 has been shown for purposes of description, the magnetic field may be produced in any known manner. For example, a permanent magnet may be employed having an air gap in which the body 10 is positioned. The winding 25 may be wound on a magnet or magnetic member having an air gap, and the body 10 positioned in that air gap. Other known arrangements for producing a magnetic field may be used.

The semiconductor body 10 is constructed of a material in which the mobility ratio or ratio of electron mobility (average electron mobility) to hole mobility (average hole mobility) is greater or less than one. It will be assumed for the moment that a material such as indium antimonide is used in which the mobility ratio is greater than one (the electron mobility is greater than the hole mobility). When the body 10 is placed in an electric field and in a magnetic field in the manner shown in FIGURE 1, the holes and electrons within the body 10 having mobility or, in other words, drifting in the electric field, will move towards a side or surface level of the body 10. The direction of the drift of the holes and electrons depends on the direction of the alternating current or electric field applied to the body 10 through the magnetic field. Therefore, the polarity of the Hall voltage available at terminals 17, 18 depends on the direction of the alternating current.

The Hall voltage $V_H$ is proportional to the direction of the alternating current I and the direction of the magnetic field H. The Hall effect is dependent upon the electric field and upon the magnetic field and changes sign if either the electric field or the magnetic field changes sign, but remains the same if both the electric field and the magnetic field change sign. The Hall voltage $V_H$ (in volts) depends on the current I (in amperes), the magnetic field H (in Gauss), the crystal thickness T (in centimeters) in the direction of H and the Hall coefficient $R_H$ (in centimeters cubed per Coulomb), according to the equation:

$$V_H = \frac{10^{-8} R_H I H}{T} \qquad (1)$$

The Hall coefficient $R_H$ is determined by the equation:

$$R_H = -A \frac{nb^2 - p}{e(nb+p)^2} \qquad (2)$$

where $n$ is the electron concentration,
$p$ is the hole concentration,
$b$ is the mobility ratio $$\frac{\mu_n}{\mu_p}$$

or ratio of electron mobility to hole mobility,
$e$ is the electronic charge, and
A is a factor depending on temperature, condition of material, and having a possibly slight dependence on the magnetic field H.

The factor A will usually have a value between 1 and 2, and the operation of the invention is relatively unaffected by the value thereof.

From an examination of Equations 1 and 2, it can be seen that the sign of the Hall coefficient $R_H$ and, therefore, the sign of the Hall or output voltage $V_H$ can be made to change by a change in the relative magnitude of the quantity $nb^2$ in relation to the quantity $p$. If $$nb^2 > p \text{ then } R_H < 0;$$

if $$nb^2 < p \text{ then } R_H > 0;$$

and if $$nb^2 = p \text{ then } R_H = 0.$$

In the application where the mobility ratio of the material used for the body 10 is greater than one, as has been assumed, the concentration of the mobile electrons and holes is determined so that in the absence of an electric field E, or $E=0$ the quantity $nb^2$ (electron concentration times the square of the mobility ratio) is considerably less than the quantity $p$ (hole concentration). The hole concentration $p$ is preferably made to be considerably greater than the electron concentration $n$, and a condition can be approached in which only hole charge carriers are present in the body 10. If this condition does not exist in the material of the body 10, the condition can be accomplished by a number of techniques known in the art. One of the conventional procedures is to dope the material of the body 10 by the addition of impurities thereto. Such impurities have been defined as donor and acceptor impurity substances. Donor impurities are defined as materials by which an excess of electrons can be made free to move about within the body 10. That is, the donor impurities can be made to give up electrons. By virtue of the negative charge which the electrons bear, the stream of electrons made available supplement the current flow through the body 10. Acceptor impurities are defined as materials by which positively charged regions or holes into which electrons flow can be created. The concentration of holes and electrons can also be determined at least in part by temperature. It has been shown in the art that as the temperature of a semiconductor material is changed, the impurity atoms or substances exhibit a corresponding change in their readiness to give up electrons in the case of the donor impurities and to provide holes in the case of acceptor impurities. It is also known in the art that as the temperature is increased the atoms of the material itself give up bonding electrons which becomes free to move through the crystal or body. In this case (intrinsic conduction), an equal number of free electrons and free holes are produced. Therefore, the concentration of the holes and electrons can be controlled as a function of the temperature of the body 10. Since they are available in the art a number of references describing procedures for doping and otherwise determining the concentration of electrons and holes in a semiconductor body, a detailed description at this time is believed to be unnecessary. By way of example, a discussion of the procedures involved may be found in "Electrons and Holes in Semiconductors" by Shockley, published by Van Nostrand Company.

In the operation of the invention, the application of the electric field to the body 10 according to the alternating current signal supplied by source 12 causes energy to be transferred to the holes. This energy is, in turn, transferred from the holes to the atom lattice of the body 10 by collisions, and so on, causing the temperature of the body 10 to increase. A condition of thermal equilibrium exists in which the average energy of the holes corresponds to the temperature of the body 10. As the energy transferred to the holes increases due to an increase in the applied current, the temperature of the body 10 increases a corresponding amount, and so on. When the applied current becomes of a higher magnitude, depending upon the material used, energy is transferred to the holes from the electric field mor rapidly than the energy can be transferred from the holes to the atom lattice of the body 10, when the holes and the atom lattice are at the same temperature. As a result, the holes gain energy until they have an energy sufficiently larger than that of the atom lattice to transfer the input power to the atom lattice. When this occurs, the holes are referred to in the art as being "hot," since the energy of the charge carriers is greater than is the case for holes in the condition of thermal equilibrium with the atom lattice of the body 10. The holes possess sufficient energy such that the collisions of the holes and the atoms of the atom lattice in the body 10 produce electron-hole pairs by impact ionization of valence electrons. For each electron freed from an atom in the lattice as a result of a collision with a hole, an electron vacancy or hole is created. This action causes the concentration of electrons and the concentration of holes to increase in equal amounts.

Figure 2:
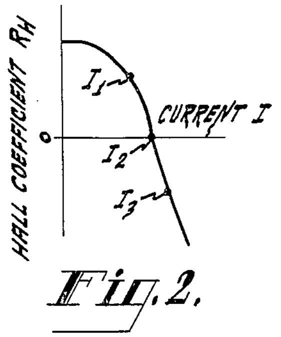
FIGURES 2, 3 and 4 are curves useful in describing the operation of the embodiment of the invention given in FIGURE 1.

It has been assumed that the body 10 is constructed of a material having a mobility ratio greater than one. It has been further assumed that the concentration of mobile electrons and holes in the body 10 has been set by the procedures outlined above so that the quantity $nb^2$ (electron concentration times the square of the mobility ratio) is less than the quantity $p$ (hole concentration). The Hall coefficient $R_H$, as defined in Equation 2, will be a positive quantity when the current I equals zero, since the quantity $nb^2$ is less than the quantity $p$. As shown in FIGURE 2, as the current I is increased from zero to a value $I_1$ according to the alternating current signal supplied by source 12, the increasing energy imparted to the mobile holes in the body results in an increase in the number of electron-hole pairs produced by the collisions of the holes and the atoms in the atom lattice of the body 10. Although the electron concentration $n$ and the hole concentration $p$ increase in equal amounts, the quantity $nb^2$ will increase at a faster rate than the quantity $p$. Since the mobility ratio $b$ is greater than one, the electron mobility being greater than the hole mobility, the product of the electron concentration $n$ and the square of the mobility ratio $b$, $nb^2$, will increase at a faster rate than the electron concentration $n$ alone. Since the hole concentration $p$ increases at the same rate as the electron concentration $n$ by the production of electron-hole pairs, the product of the electron concentration $n$ times the square of the mobility ratio $b$ increases at a faster rate determined by the value of the mobility ratio $b$ than the hole concentration $p$.

As the current I increases causing additional electron-hole pairs to be produced, the quantity $nb^2$ becomes more nearly equal in value to the quantity $p$. The quantity $nb^2-p$ in Equation 2 becomes less negative, and the Hall coefficient $R_H$ becomes correspondingly less positive. At a value $I_2$ of the current I, the quantity $nb^2$ equals the quantity $p$, and the Hall coefficient $R_H$ is equal to zero. As the current I continues to increase to a value $I_3$ and additional electron-hole pairs are produced, the quantity $nb^2$ becomes increasingly larger than the quantity $p$. The quantity $nb^2-p$ is positive, and the Hall coefficient $R_H$ is a negative quantity.

Figure 3:
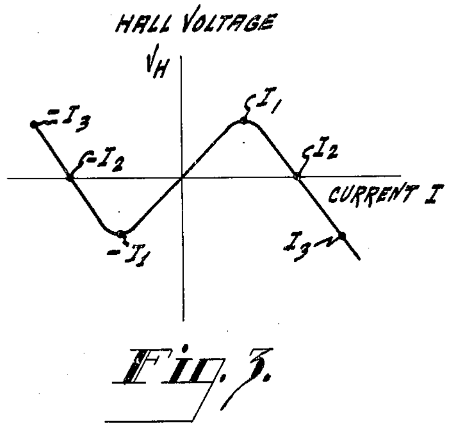

The sign of the Hall voltage $V_H$ is dependent upon the sign of the Hall coefficient $R_H$, the magnetic field H and the current I. By substituting the values of the Hall coefficient $R_H$ given in the curve of FIGURE 2 in the Equation 1, a curve as given in FIGURE 3 results. When the increasing current I is positive going during the positive half cycle of the alternating current signal and of the value $I_1$, the positive Hall coefficient $R_H$ causes the Hall voltage $V_H$ to be positive. When the Hall coefficient $R_H$ equals zero at the value $I_2$ of the current I, the Hall voltage $V_H$ is zero. When the current I is of a value $I_3$, the Hall coefficient $R_H$ is negative, and the Hall voltage $V_H$ is negative. The Hall voltage $V_H$ changes sign in the reverse direction as the current I becomes less positive. During the negative half cycle of the incoming alternating current signal supplied by the source 12, the current I is negative. Therefore, when the current I is of a value $-I_1$, the current I being negative and the Hall coefficient $R_H$ being positive, the Hall voltage $V_H$ is negative, and so on.

Figure 4:
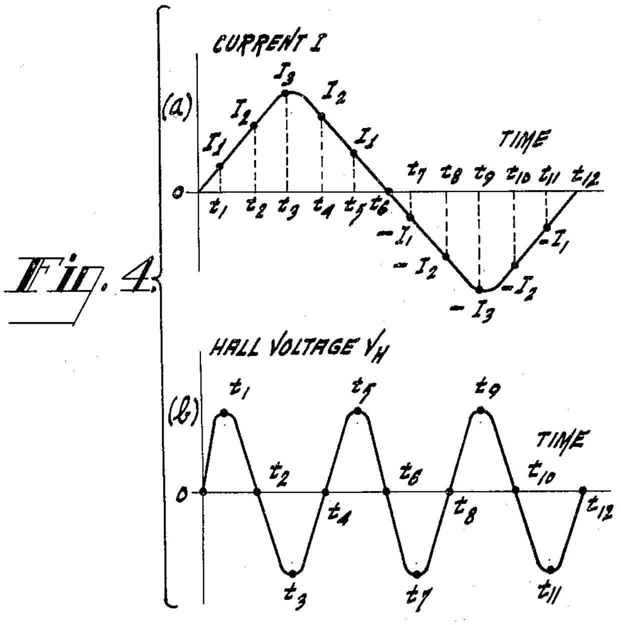

The curve given in FIGURE 4*a* represents the change in sign of the current I during one typical cycle of the alternating current signal of frequency F supplied by source 12, and the curve given in FIGURE 4*b* represents the Hall voltage $V_H$ or output signal available at the output terminals 17 and 18 for application to a utilization circuit. The incoming signal is set so as to have a maximum amplitude corresponding to the current value $I_3$ shown in the curves of FIGURES 2 and 3. From the information provided from the curve in FIGURE 3, it can be seen that, when the current I is of a value $I_1$ at time $t_1$ of the curve in FIGURE 4*a*, the Hall voltage $V_H$ is positive. At time $t_2$ when the current I equals the value $I_2$, the Hall voltage $V_H$ is zero. When the current I is of a value $I_3$ at time $t_3$, the Hall voltage $V_H$ is negative, and so on. At times $t_6$ and $t_{12}$, current I is zero, and the Hall voltage $V_H$ is also zero. The outgoing signal shown in FIGURE 4*b* available at terminals 17 and 18 is of a frequency 3F or three times the frequency F of the signal supplied by soure 12 and depicted in FIGURE 4*a*.

The Hall voltage $V_H$ is, as shown in Equation 1, determined in part by the magnetic field H. Therefore, the magnitude of the constant magnetic field H supplied by winding 25 can be determined according to the level of the output desired at the terminals 17, 18.

From the above description of the invention, it can be seen that the mobility ratio $b$ acts as a weighing factor. The value of the quantity $b$ determines the number of electron-hole pairs that must be produced to cause the Hall coefficient $R_H$ to change sign and, therefore, the magnitude of the input signal required to complete the multiplying action. For example, if the body 10 has $10^{15}$ holes per cubic centimeter and $b$ equals 1.5, it would be necessary to produce approximately 8 times $10^{14}$ electron-hole pairs to cause the Hall coefficient $R_H$ to become equal to zero. On the other hand, if $b$ equals 60, as in indium antimonide, approximately 3 times $10^{11}$ electron-hole pairs are required to be produced. The larger the quantity $b$ in excess of one, the smaller is the number of electron-hole pairs which must be produced, requiring a corresponding reduction in the strength of the input signal necessary to actuate the frequency multiplier. By way of example, assuming a body of P type indium antimonide having a hole mobility of approximately $10^6$ centimeters squared per volt seconds and an effective mass of the holes equal to 0.3 centimeter, an electric field of only approximately 20 volts/centimeter would be required to give electron-hole pair excitation.

During the operation of the invention as described, some change in the mobility ratio $b$ will occur due to the energy imparted to the charge carries or holes in the example given above. The difference between the electron concentration and hole concentration is, however, sufficiently large so that the relatively small change in the mobility ratio $b$ does not alter or otherwise affect the operation of the frequency multiplier in the manner described.

Indium antimonide and indium arsenide have been given as examples of materials where the applied electric field required to produce electron-hole pairs is within a practical, operable range. In practice, any material in which the mobility ratio $b$ is different from one can be adapted for use such as indium phosphide, gallium aresnide, and so on. Since the input and output of the frequency multiplier are both resistive in nature, the frequency multiplier is capable of operation over a wide range of frequencies including high frequencies. The primary limitation is the recombination time of mobile charge carriers. The more rapidly the mobile charge carriers are recombined, the higher is the frequency of operation possible. Since materials such as indium antimonide and indium arsenide have short recombination times, the frequency multiplier is capable of operation at frequencies in the hundreds of megacycles.

It has been assumed that the material used for the body 10 has a mobility ratio greater than one. Materials may be used in which the hole mobility is greater than the electron mobility such that the mobility ratio is less than one. In such a case, the concentration of electrons and holes in the body 10 is determined so that the quantity $nb^2$ is greater than the quantity $p$. The electron concentration is determined in the material by any of the methods referred to above to be sufficiently larger than the hole concentration so that the electron concentration times the square of the mobility ratio is greater than the hole concentration. The smaller the value of the mobility ratio $b$ less than one, the greater is the concentration of electrons required. Since the quantity $nb^2-p$ of Equation 2 is now positive, the Hall coefficient $R_H$ is negative at zero current I. As the current I increases causing additional electron-hole pairs to be produced, the hole concentration $p$ will increase at a faster rate than the quantity $nb^2$. Although the electron concentration $n$ increases at the same rate as the hole concentration $p$, the mobility ratio $b$ acting as a weighing factor and having a value less than one reduces the rate at which the quantity $nb^2$ increases according to the value of the mobility ratio $b$. The hole concentration $p$ increases at a faster rate than the quantity $nb^2$ until the hole concentration $p$ equals the quantity $nb^2$, and the Hall coefficient $R_H$ is equal to zero.

As the current I increases further to the value $I_3$ and additional electron-hole pairs are produced, the hole concentration $p$ exceeds the quantity $nb^2$ and the Hall coefficient $R_H$ becomes positive. The resulting curve of the Hall coefficient $R_H$ is similar to that given in FIGURE 2 but is reversed in polarity. Since the Hall voltage $V_H$ is determined according to the change in the sign of the Hall coefficient $R_H$, a curve for the resulting change in the Hall voltage $V_H$ is similar to the curve given in FIGURE 3 but of opposite polarity. That is, for the value $I_1$ of the current I, the Hall voltage $V_H$ is negative. For the value $-I_1$ of the current I, the Hall voltage $V_H$ is positive, and so on. The invention will operate to produce an output signal having a frequency three times the frequency of the alternating current signal supplied by source 12 and one hundred and eighty degrees out of phase with the signal shown in FIGURE 4*b*.

A frequency multiplier is disclosed capable of producing an output signal having a frequency three times the frequency of the input signal. No tuned resonant circuits are required, permitting the operation of the invention over a wide range of frequencies without further adjustment once the invention has been placed in operation. Since the output signal is in sync with the driving signal in that the output signal crosses the zero axis simultaneously with the driving signal, the invention provides for a suitable choice of the other circuit components to be operated in connection therewith.

Figure 5:
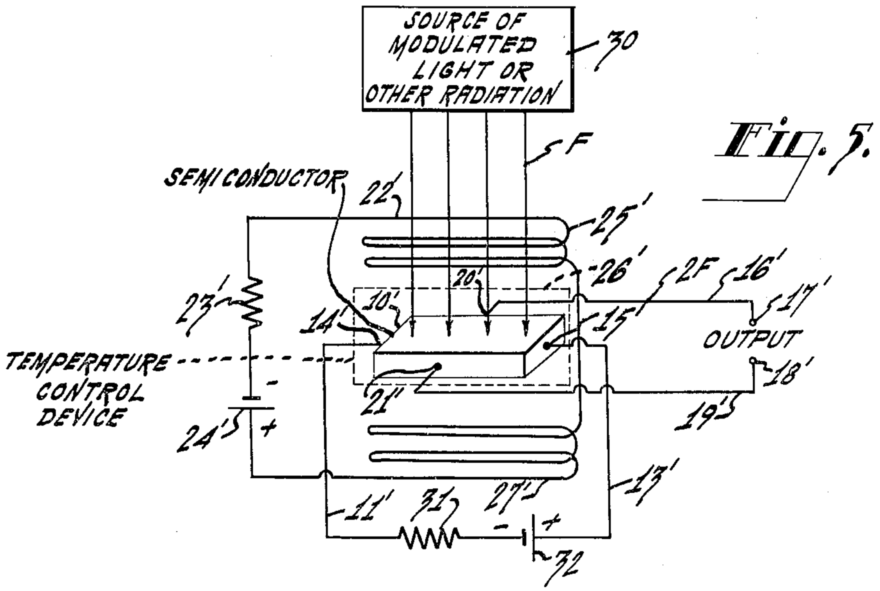
FIGURE 5 is a circuit diagram of a further embodiment of a frequency multiplier constructed according to the invention.

In the embodiment of the invention given in FIGURE 1, the operation is determined according to the alternating current signal supplied by source 12. FIGURE 5 shows a further embodiment of the invention in which a constant magnetic field and a constant electric field are applied to the body 10. Electron-hole pair excitation is accomplished by means of a source 30 of modulated light or other radiation. The various circuit components given in FIGURE 5 similar to the corresponding circuit components found in FIGURE 1 have been given the same reference numerals primed. A constant magnetic field is applied to the body 10′ by means of the electrical path including lead 22′, resistor 23′, battery 24′, lead 27′ and the winding 25′ which may be a permanent magnet or other magnetic device as described in connection with FIGURE 1. The constant electric field is supplied by the electrical path including lead 11′, a resistor 31, a source of unidirectional potential represented by battery 32 and lead 13′. The voltages supplied by the battery 32 and the battery 24 are determined so as to provide the desired level of the output signal or Hall voltage $V_H$.

The source 30 may be any means for producing and radiating energy to the body 10′. The source 30 may be a light source for emitting photons. In other applications, the source 30 may be a means for emitting electrons or heavier particles. A radio active source, or an electron generator including, for example, a hot cathode with means for accelerating voltages may be used. In a further application, a semiconductor arrangement may be used in which minority charge carriers present in one body of semiconductor material of one type of conductivity are injected by means of a junction into a second body of semiconductor material of opposite type of conductivity. The minority charge carriers recombine with the available majority charge carriers in the second semiconductor body to produce the emission or radiation of energy to the body 10′. Many examples of suitable sources for radiating energy are known and a detailed description thereof is believed to be unnecessary.

The source 30 is arranged to radiate energy of a frequency F to the body 10′ sufficient in magnitude to exceed the forbidden band gap of the material used for the body 10′. The band gap is defined as the energy required to produce electron-hole pair excitation and is a function of the material used. The modulated energy radiated by the source 30 whether photons, electrons or other charged particles is determined to be of sufficient magnitude to exceed the amount of energy required to exceed the band gap and to produce electron-hole pairs in the body 10′. In the interaction of the radiated photons, electrons or other charged particles with the atoms of the atom lattice of the body 10′, excess energy is produced in the interaction to cause the atoms to release valence electrons. As each electron is freed, an electron vacancy is created, producing an electron-hole pair. As the energy supplied by the source 30 exceeds that required to cause electron-hole pair excitation in the body 10′, a correspondingly larger number of electron-hole pairs are produced, and so on. As indicated by the arrows in FIGURE 5, the light or radiation should fall uniformly over the body 10′ so that the number of electron-hole pairs produced is not a function of the displacement of the radiation along the body 10′.

Figure 6:
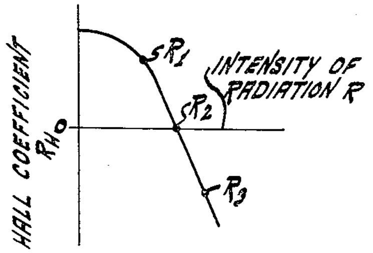
FIGURES 6, 7 and 8 are curves useful in describing the operation of the embodiment given in FIGURE 5.

The embodiment of the invention shown in FIGURE 5 operates in much the same manner as the embodiment given in FIGURE 1. Assuming that the body 10′ is constructed of a material in which the mobility ratio $b$ is greater than one and in which the quantity $nb^2$ is set to be less than the quantity $p$, the Hall coefficient $R_H$ is at some positive value determined by the value of the applied electric field and of the applied magnetic field when the intensity of radiation R from source 30 equals zero. This is true since the quantity $nb^2-p$ in Equation 2 is negative. As the intensity of the radiation R increases to a value $R_1$, shown in the curve of FIGURE 6, additional electron-hole pairs are produced and the quantity $nb^2$ becomes more nearly equal to the quantity $p$. The quantity $nb^2-p$ becomes less negative, and the Hall coefficient $R_H$ becomes correspondingly less positive. When the intensity of radiation R equals $R_2$, the quantity $nb^2$ equals the quantity $p$, and the Hall coefficient $R_H$ equals zero. When the intensity of radiation R equals $R_3$, the quantity $nb^2$ is greater than the quantity $p$, and the Hall coefficient $R_H$ is negative.

Figure 8:
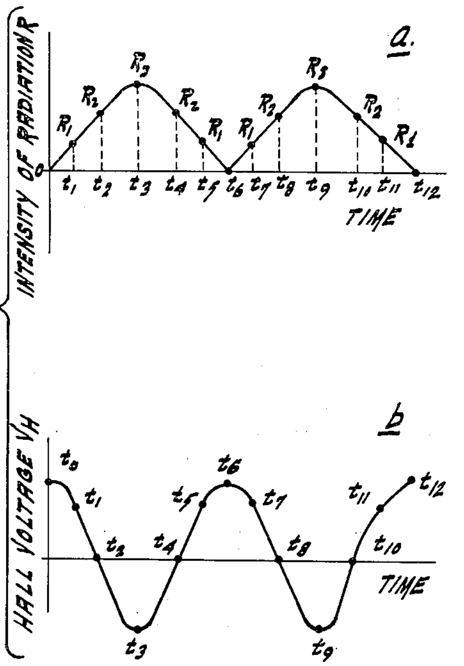
Figure 7:
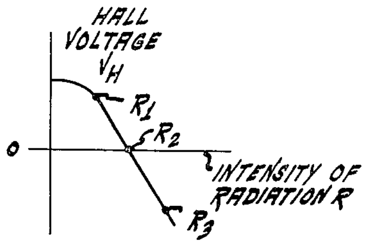

As shown in the curve of FIGURE 7, the Hall voltage $V_H$ changes sign according to the change in sign of the Hall coefficient $R_H$. The Hall voltage $V_H$ is positive when the intensity of radiation R equals zero and becomes increasingly less positive and then negative going as the intensity of radiation R increases to the value $R_3$. FIGURE 8*a* shows two typical cycles of the modulated energy radiated to the body 10′ from the source 30. The energy radiated by the source 30 is of only one polarity and is shown as increasing to the value $R_3$ and then returning to a zero value at a given frequency rate F. The resulting Hall voltage $V_H$ or output signal is shown in FIGURE 8*b*. When the intensity of radiation R equals zero, the Hall voltage $V_H$ is positive. At the value $R_1$ and time $t_1$, the Hall voltage $V_H$ is less positive. At the value $R_2$ and time $t_2$, the Hall voltage $V_H$ equals zero. At the value $R_3$ and time $t_3$, the Hall voltage $V_H$ is negative, and so on. As shown in the curve of FIGURE 8b, the output signal appearing at the terminals 17, 18 for application to a utilization circuit is of a frequency twice the frequency of the energy supplied by the source 30. A frequency multiplier is provided that can be operated at room temperature or anywhere in the extrinsic range of the semiconductor material.

Instead of using a material in which the mobility ratio $b$ is greater than one, a material may be used for the body 10 in the embodiment of FIGURE 5 in which the mobility ratio $b$ is less than one. The quantity $nb^2$ is set to be greater than the quantity $p$ as described above. The curve for the Hall coefficient $R_H$ is similar to the curve given in FIGURE 6 but is reversed in polarity, and the curve for the Hall voltage $V_H$ is similar to the curve given in FIGURE 7 but is reversed in polarity. When the intensity of radiation R equals zero, the Hall voltage $V_H$ is negative. As the intensity of radiation R increases to the value $R_3$, the Hall voltage $V_H$ will become less negative and then positive going. An output signal will appear at terminals 17, 18 similar to that shown in FIGURE 8*b* but one hundred and eighty degrees out of phase.

A frequency multiplier is provided according to the embodiment of the invention given in FIGURE 5 for multiplying by a factor of two. The operating frequency is limited by the previously discussed recombination times of mobile charge carriers and by the frequency of the radiation supplied by the source 30. Circuits are available for controlling the emission and radiation of light and other energy at rapid rates, and the frequency multiplier shown in FIGURE 5 is capable of operation over a wide range of frequencies including frequencies in the ultra high frequency range.

Figure 9:
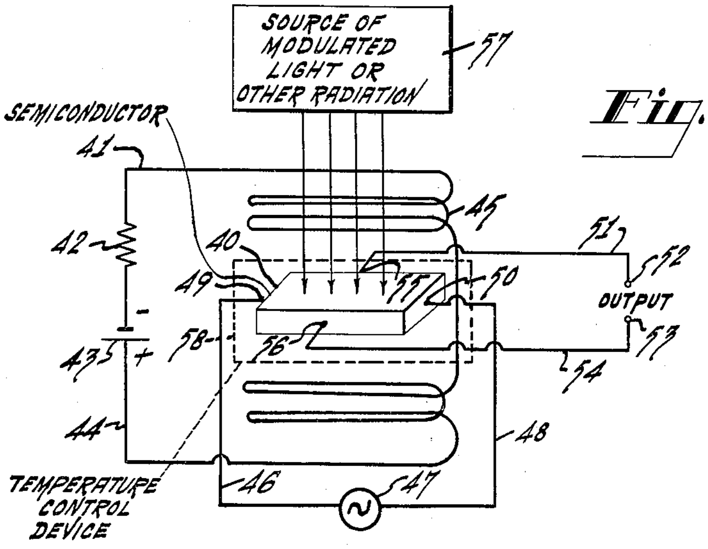
FIGURE 9 is a circuit diagram of a still further embodiment of a frequency multiplier constructed according to the invention.

A further embodiment of the invention is shown in FIGURE 9. A constant magnetic field is applied to the semiconductor body 40 by an electrical path including lead 41, resistor 42, battery 43, lead 44 and the winding 45 which, as described above, may be a permanent magnet or other magnetic device. An electric field is applied to the body 40 by an electrical path including lead 46, a source of alternating current signal 47 and lead 48. Leads 46, 48 are connected to the body 40 at points 49, 50, respectively, using one of the techniques referred to above. An output circuit is provided including lead 51, terminals 52 and 53 and lead 54. Leads 51 and 54 may be connected to the body 40 at points 55 and 56, respectively, using the same technique as is used to connect leads 46, 48 to the body 40. A source 57 of modulated light or other radiation similar in construction and operation to the source 30 shown and described in connection with the embodiment given in FIGURE 5 is provided. The source 57 is arranged to radiate energy in the form of photons, electrons or other charge particles uniformly over the surface of the body 40, as indicated by the arrows.

The embodiment of the invention shown in FIGURE 9 can be adapted for use in one of two applications. If the energy radiated by the source 57 and the alternating current signal supplied by the source 47 are of the same given frequency and in phase, the Hall voltage $V_H$ or output signal appearing at terminals 52, 53 is of a frequency three times the given frequency. If the alternating current signal supplied by source 47 is of one frequency and the energy radiated by the source 57 is of a different frequency such that the two different frequencies are integral multiples of some common frequency and the two frequencies are in phase in the sense that the alternating current signal and the radiated energy pass through zero at the same time at regular time intervals, the Hall voltage $V_H$ or output signal is of a frequency equal to the frequency of the alternating current signal plus twice the frequency of radiated energy. In the first application, the embodiment given in FIGURE 9 acts as a frequency multiplier. In the second application, the embodiment acts as an adder and frequency multiplier to mix two signal frequencies so as to give an output frequency depending on both input frequencies linearly.

The operation of the embodiment given in FIGURE 9 is similar to that of the embodiment given in FIGURE 5 with the exception that an alternating electric field is provided in place of the constant electric field. The voltage supplied by the battery 43 and the magnitude of the alternating current signal supplied by the source 47 are determined according to the level of the output signal desired at the terminals 52 and 53. The direction of the current flow and, therefore, the direction of the drift of the mobile charge carriers in the body 40 changes at the frequency of the alternating current signal supplied by source 47. The electric field and the magnitude of the alternating current may be very small since it is only required that the drift direction of the mobile charge carriers in the body 40 be changed as a function of the frequency of the signal supplied by the source 47. This is to be contrasted to the operation of the embodiment of the invention given in FIGURE 1 where the current I is of a magnitude sufficient to produce "hot" charge carriers, resulting in electron-hole pair excitation.

The source of light or other radiation 57 is operated to supply energy of a magnitude sufficient to exceed the band gap of the material used for the body 40. As the energy in the form of a stream of photons, electrons or other charged particles supplied by the source 57 increases in magnitude over that necessary to produce electron-hole pair excitation in the body 40, the interaction of the photons, electrons or other charged particles radiated by the source 57 with the atoms in the atom lattice of the body 40 results in a corresponding increase in the number of electron-hole pairs produced. Assuming that the material used for the body 40 has a mobility ratio greater than one such as indium antimonide and that the quantity $nb^2$ (electron concentration times the square of the mobility ratio) is set to be less than the quantity $p$ (hole concentration) as described above, the Hall coefficient $R_H$ changes sign in a manner similar to that indicated in the curve of FIGURE 6 as additional electron-hole pairs are produced by the increasing intensity of the radiation R.

It will first be assumed that the frequency of the signal energy radiated by the source 57 and the frequency of the alternating current signal supplied by source 47 are the same and in phase. FIGURE 10*a* shows a typical cycle of the alternating current signal occurring during times $t_1$—$t_{12}$. FIGURE 10*b* shows typical cycles of the radiation R occurring during the time $t_1$—$t_{12}$, and FIGURE 10*c* shows the resulting Hall voltage $V_H$. During the first cycle of the radiation R, the current I is positive and the resulting Hall voltage $V_H$ occurs in the polarity shown during the time interval $t_1$—$t_6$. Since the current I is zero at zero time, the Hall voltage $V_H$ is also zero at zero time (Equation 1). At times $t_2$ and $t_4$, the radiation R equals zero, the Hall coefficient $R_H$ is zero and, therefore, the Hall voltage $V_H$ is zero (Equation 1). During the second cycle of the radiation R, the current I is negative causing the mobile charge carriers (electrons and holes) to drift in a direction opposite to the direction of the drift when the current I is positive. The Hall voltage $V_H$ occurring during times $t_7$—$t_{12}$ is the same in shape as that occurring during times $t_1$—$t_6$ but is of reversed polarity. This is true since the negative current I results in the product of the current, magnetic field and Hall coefficient being of opposite polarity to the product resulting when the current I is positive. The Hall voltage $V_H$ changes in a reversed direction as compared to the direction of change occurring when the current I is positive. The Hall voltage $V_H$ or output signal appearing at terminals 52 and 53 is of a frequency three times the frequency of the alternating current signal supplied by source 47 and of the radiated energy from source 57.

Figure 11:
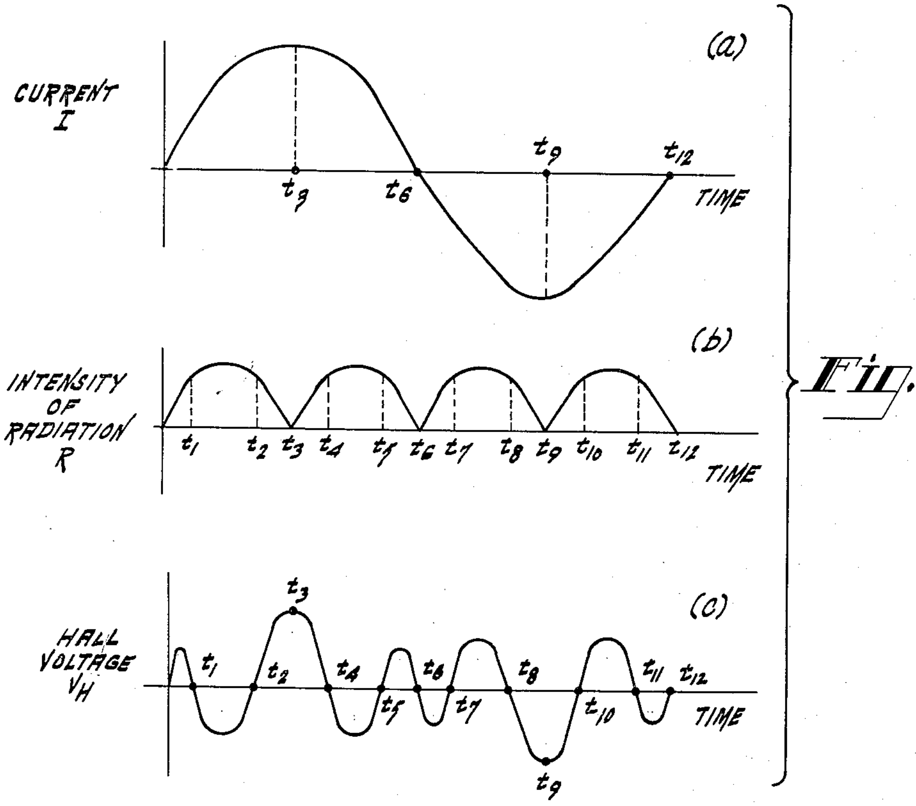

The operation of the embodiment of the invention given in FIGURE 9 when the frequency of the alternating current signal supplied by the source 47 and the frequency of the radiation from source 57 are integral multiples of some common frequency is shown in the curves of FIGURE 11. FIGURE 11*a* shows a typical cycle of the alternating current signal supplied by source 47. FIGURE 11*b* shows the cycle of the radiation from the source 57 occurring during the single cycle of the alternating current signal. The frequency of the radiation is assumed to be twice that of the alternating current signal. Figure 11*c* shows the resulting Hall voltage $V_H$ or output signal appearing at the terminals 52 and 53.

At zero time and at times $t_6$ and $t_{12}$, the current I is zero, and the Hall voltage $V_H$ is zero. At times $t_1$, $t_2$, $t_4$, $t_5$, $t_7$, $t_8$, $t_{10}$ and $t_{11}$, the intensity of the radiation R reaches a magnitude such that the Hall coeficient $R_H$ passes through zero as it changes sign from positive to negative. At times $t_1$, $t_2$, $t_4$, $t_5$, $t_7$, $t_8$, $t_{10}$ and $t_{11}$, therefore, the Hall voltage $V_H$ is zero. At time $t_3$, the radiation R is zero. Since the current I is positive, the Hall voltage $V_H$ is positive. At time $t_9$, the current I is negative, and the radiation R is zero. The Hall voltage $V_H$ is negative, and so on. The Hall voltage $V_H$ during the time $t_6$—$t_{12}$ is of the same shape as the Hall voltage $V_H$ occurring during the time $t_1$—$t_6$ but of reversed polarity due to the change of the current I from a positive to a negative polarity. The output signal or Hall voltage $V_H$ has a frequency equal to the frequency of the alternating current signal, FIGURE 11*a*, plus twice the frequency of the radiation R, FIGURE 11*b*, as shown in the curve of FIGURE 11*c*. The Hall voltage $V_H$, varies as a function of the change in the current I due to the change in the drift direction of the mobile charge carriers in response to the alternating current signal supplied by source 47 and as a function of the change in the sign of the Hall coefficient $R_H$ due to the production of electron-hole pairs in response to the reception by the body 40 of the energy radiated from source 57.

Figure 10:
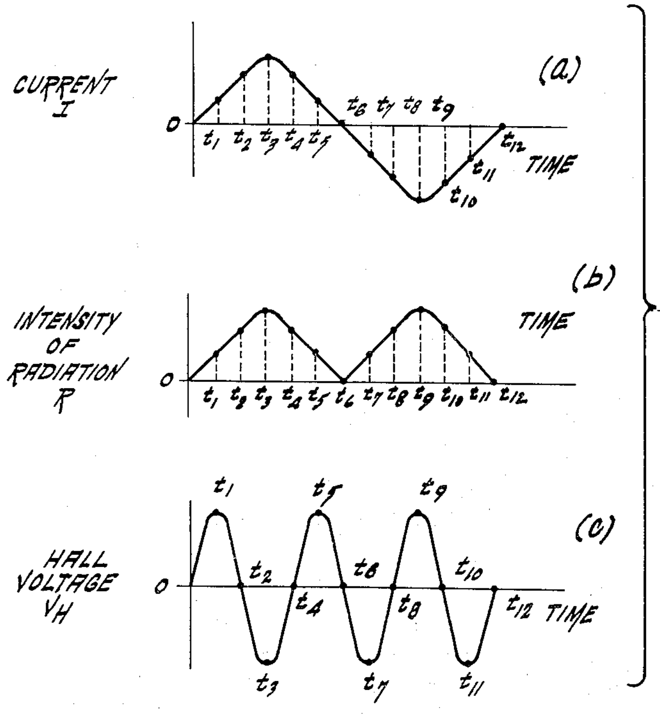
FIGURES 10 and 11 are curves useful in describing the operation of the embodiment of the invention given in FIGURE 9.

As in the case of the embodiment given in FIGURE 5, the operating frequency is limited by the recombination time of mobile charge carriers and by the frequency of the radiation received from source 57. Circuits are available for controlling the frequency of light and other energy radiation at rapid rates, and the embodiment of the invention given in FIGURE 9 is capable of operation at high frequencies since the body 40 can be made to have recombination times in the order of $10^{-10}$ seconds or faster. In one application as shown in FIGURE 10, a frequency multiplier is provided for multiplying the frequency of two input signals by a factor of three when the frequency of the input signals is the same, and the signals are in phase. In the second application as shown in FIGURE 11, a circuit is provided which functions as an adder on a time base. Two input signals of different frequencies can be mixed to give an output signal of a frequency depending on the frequency of both input signals linearly.

While it has been assumed that a material is used for the body 40 having a mobility ratio greater than one, a material in which the mobility ratio is less than one may be used. The quantity $nb^2$ is set to be greater than the quantity $p$, and the operation is similar to that described above. The respective Hall voltages $V_H$ produced in the applications mentioned are the same as shown in FIGURES 10*c* and 11*c* but are one hundred and eighty degrees out of phase.

While the frequency multiplier of the invention is capable of operation at room temperature using known materials of extrinsic character, the semiconductor bodies may be located in a temperature control device arrangement to prevent overheating and to provide a parameter for determining the concentration of electrons and holes in the manner described above. Such a control device is indicated generally in FIGURES 1, 5 and 9 as dashed boxes 26, 26' and 58, respectively. The temperature control device may appear in any of a number of known forms. Large copper busses or similar heat transferring conductors may be connected to the ends of the semiconductor bodies, the conductors being arranged to carry heat to a heat dissipation mechanism such as liquid nitrogen bath. The semiconductor bodies may be suspended directly in a suitable liquid bath. Means for maintaining a controlled temperature with semiconductors are known and described as, for example, in an article "Low Temperature Electronics," Proceedings of the IRE, vol. 42, pages 408–412, February, 1954, and a detailed discussion thereof is believed to be unnecessary.

A frequency multiplier is disclosed for use in a wide range of applications. A number N of the frequency multipliers may, for example, be connected in series to produce a signal having a frequency $3^N$ times the input frequency, and so on. Since no tuned circuits are required, the frequency multiplier can operate over a wide range of frequencies without the necessity of returning and other adjustments.

What is claimed is:

1. In combination, a body of semiconductor material exhibiting a characteristic dependence of an output signal taken across one axis of said body on an electric and magnetic field applied to said body, said material being of a type in which both electrons and holes are present and in which the electron mobility is different from the hole mobility, the material of said body having a concentration of electrons in relation to the concentration of holes to cause the product of the electron concentration times the square of the ratio of electron mobility to hole mobility to be in a given direction of inequality with respect to the hole concentration according to said mobility ratio, means to produce in said body additional electron-hole pairs varying in number at a given frequency rate including means to apply a constant magnetic field to said body and also an electric field to said body, said first-mentioned means being arranged to cause by the production of said additional electron-hole pairs said product to change from said given direction of inequality to the opposite direction of inequality and back to said given direction of inequality with respect to said hole concentration as a function of said variation in the number of said additional electron-hole pairs produced, said body responding to said change in said product with respect to said hole concentration to produce said output signal having a frequency equal to said given frequency multiplied by a given factor.

2. In combination, a body of semiconductor material exhibiting a characteristic dependence of an output signal taken across one axis of said body on an electric and magnetic field applied to said body, said material being of a type in which both electrons and holes are present and in which the electron mobility is different from the hole mobility, the electron concentration being set in relation to the hole concentration in said body to cause the product of the electron concentration times the square of of the ratio of electron mobility to hole mobility to be in a given direction of inequality with respect to said hole concentration according to said mobility ratio, means to apply a constant magnetic field to said body, means to apply an electric field to said body varying according to the given frequency of an alternating current input signal and of sufficient magnitude to produce additional electron-hole pairs in said body varying in number at said given frequency rate, said last-mentioned means being arranged by the production of said additional electron hole pairs in said body to cause said product to change from said given direction of inequality to the opposite direction of inequality and return to said given direction of inequality with respect to said hole concentration as a function of said variation in the number of said additional electron-hole pairs produced, said body responding to said change in said product with respect to said hole concentration to produce said output signal of a frequency equal to said given frequency multiplied by a given factor.

3. In combination, a body of semiconductor material exhibiting a characteristic dependence of an output signal taken across one axis of said body on an electric and magnetic field applied to said body, said material being of a type in which both electrons and holes are present and in which the electron mobility is different from the hole mobility, the electron concentration being set in relation to the hole concentration in said body to cause the product of the electron concentration times the square of the ratio of electron mobility to hole mobility to be in a given direction of inequality with respect to said hole concentration according to said mobility ratio, means to apply a constant magnetic field to said body, means to apply a constant electric field to said body, a source of energy varying at a given frequency rate positioned and arranged to radiate said energy from said source to said body with a sufficient magnitude to produce additional electron-hole pairs in said body varying in number at said given frequency rate, the production of said additional electron-hole pairs in said body causing said product to change from said given direction of inequality to the opposite direction of inequality and back to said given direction of inequality with respect to said hole concentration as a function of said variation in the number of said additional electron-hole pairs produced, said body responding to said change in said product with respect to said hole concentration to produce said output signal having a frequency equal to said given frequency multiplied by a given factor.

4. In combination, a body of semiconductor material exhibiting a characteristic dependence of an output signal taken across one axis of said body on an electric and magnetic field applied to said body, said material being of a type in which both electrons and holes are present and in which the electron mobility is different from the hole mobility, the electron concentration being set in relation to the hole concentration in said body to cause the product of the electron concentration times the square of the ratio of electron mobility to hole mobility to be in a given direction of inequality with respect to said hole concentration according to said mobility ratio, means to apply a constant magnetic field to said body, means to apply an electric field to said body varying according to the given frequency of an alternating current input signal, a source of energy varying at a frequency rate equal to said given frequency and in phase with said input signal positioned and arranged to radiate said energy to said body at sufficient magnitude to produce additional electron-hole pairs in said body varying in number at said given frequency rate, the production of said additional electron-hole pairs causing said product to change from said given direction of inequality to the opposite direction of inequality and back to said given direction of inequality with respect to said hole concentration as a function of said variation in the number of said additional electron-hole pairs produced, said body responding to said change in said product with respect to said hole concentration to produce said output signal having a frequency equal to said given frequency times a given factor.

5. In combination, a body of semiconductor material exhibiting a characteristic dependence of an output signal taken across one axis of said body on an electric and magnetic field applied to said body, said material being of a type in which both electrons and holes are present and in which the electron mobility is different from the hole mobility, the electron concentration being set in relation to the hole concentration in said body to cause the product of the electron concentration times the square of the ratio of electron mobility to hole mobility to be in a given direction of inequality with respect to said hole concentration according to said mobility ratio, means to apply a constant magnetic field to said body, means to apply an electric field to said body varying according to the given frequency of an alternating current input signal, a source of energy varying at a second frequency and in phase with said input signal in the sense that said energy and said input signal pass through zero simultaneously at regular time intervals, said second frequency and said given frequency being integral multiples of a common frequency, said source being positioned and arranged to radiate said energy to said body at sufficient magnitude to produce additional electron-hole pairs in said body varying in number at said second frequency rate, the production of said additional electron-hole pairs causing said product to change from said given direction of inequality to the opposite direction of inequality and back to said given direction of inequality with respect to said hole concentration as a function of said variation in the number of said additional electron-hole pairs produced, said body responding to said change in said product with respect to said hole concentration to produce said output signal of a frequency equal to said given frequency plus two times said second frequency.

6. A frequency multiplier comprising, in combination, a Hall effect element constructed of a semi-conductor material exhibiting a characteristic dependence of the Hall voltage on an electric and magnetic field applied to said body, said material being of a type in which both electrons and holes are present and in which the electron mobility is greater than the hole mobility, the concentration of electrons being set in relation to the hole concentration in said element to cause the product of the electron concentration times the square of the ratio of electron mobility to hole mobility to be of a value less than said hole concentration, means to produce in said element additional electron-hole pairs varying in number at a given frequency rate including means to apply a constant magnetic field to said element and also an electric field to said element, said first-mentioned means being arranged by the production of said additional electron-hole pairs to cause said product to change from said value less than said hole concentration to a value greater than said hole concentration and back to said value less than said hole concentration as a function of said variation in the number of said additional electron-hole pairs produced, said element responding to said change in the value of said product in relation to said hole concentration to produce said Hall voltage having a frequency equal to said given frequency multiplied by a given factor.

7. A frequency multiplier comprising, in combination, a Hall effect element constructed of a semiconductor material exhibiting a characteristic dependence of the Hall voltage on an electric and magnetic field applied to said body, said material being of a type in which both electrons and holes are present and in which the electron mobility is smaller than the hole mobility, the concentration of electrons being set in relation to the hole concentration in said element to cause the product of the electron concentration times the square of the ratio of electron mobility to hole mobility to be of a value greater than said hole concentration, means to produce in said element additional electron-hole pairs varying in number at a given frequency rate including means to apply a constant magnetic field to said element and also an electric field to said element, said first-mentioned means being arranged by the production of said additional electron-hole pairs to cause said product to change from said value greater than said hole concentration to a value less than said hole concentration and back to said value greater than said hole concentration as a function of said variation in the number of said additional electron-hole pairs produced, said element responding to said change in the value of said product in relation to said hole concentration to produce said Hall voltage having a frequency equal to said given frequency multiplied by a given factor.

8. In combination, a body of semiconductor material exhibiting a characteristic dependence of an output signal taken across one axis of said body on an electric and magnetic field applied to said body, said material being of a type in which both electron and holes are present and in which the electron mobility is greater than the hole mobility, the electron concentration being set in relation to the hole concentration in said body to cause the product of the electron concentration times the square of the ratio of electron mobility to hole mobility to be of a value less than said hole concentration, means to apply a constant magnetic field to said body, means to apply an electric field to said body varying according to the given frequency of an alternating current input signal and of sufficient magnitude to produce additional electron-hole pairs in said body varying in number at said given frequency rate, said last-mentioned means being arranged by the production of said additional electron-hole pairs in said body to cause said product to change from said value less than said hole concentration to a value greater than said hole concentration and back to said value less than said hole concentration as a function of said variation in the number of said additional electron-hole pairs produced, said body responding to said change in the value of said product in relation to said hole concentration to produce said output signal having a frequency equal to three times said given frequency.

9. In combination, a body of semiconductor material exhibiting a characteristic dependence of an output signal taken across one axis of said body on an electric and magnetic field applied to said body, said material being of a type in which both electron and holes are present and in which the electron mobility is greater than the hole mobility, the electron concentration being set in relation to the hole concentration in said body to cause the product of the electron concentration times the square of the ratio of electron mobility to hole mobility to be of a value less than said hole concentration, means to apply a constant magnetic field to said body, means to apply a constant electric field to said body, a source of energy varying at a given frequency rate positioned and arranged to radiate said energy from said source to said body with a sufficient magnitude to produce additional electron-hole pairs in said body varying in number at said given frequency rate, the production of said additional electron-hole pairs in said body causing said product to change from said value less than said hole concentration to a value greater than said hole concentration and back to said value less than said hole concentration as a function of said variation in the number of said additional electron-hole pairs produced, said body responding to said change in the value of said product in relation to said hole concentration to produce said output signal having a frequency equal to two times said given frequency.

10. In combination, a body of semiconductor material exhibiting a characteristic dependence of an output signal taken across one axis of said body on an electric and magnetic field applied to said body, said material being of a type in which both electron and holes are present and in which the electron mobility is greater than the hole mobility, the electron concentration being set in relation to the hole concentration in said body to cause the product of the electron concentration times the square of the ratio of electron mobility to hole mobility to be of a value less than said hole concentration, means to apply a constant magnetic field to said body, means to apply an electric field to said body varying according to the given frequency of an alternating current input signal, a source of energy varying at a frequency rate equal to said given frequency and in phase with said input signal positioned and arranged to radiate said energy to said body at sufficient magnitude to produce additional electron-hole pairs in said body varying in number at said given frequency rate, the production of said additional electron-hole pairs causing the value of said product to change from said value less than said hole concentration to a value greater than said hole concentration and back to said value less than said hole concentration as a function of said variation in the number of said additional electron-hole pairs produced, said body responding to said change in the value of said product in relation to said hole concentration to produce said output signal having a frequency equal to three times said given frequency.

References Cited in the file of this patent

UNITED STATES PATENTS

| | | |
|---|---|---|
| 2,550,492 | Millar | Apr. 24, 1951 |
| 2,714,182 | Hewitt | July 26, 1955 |
| 2,736,822 | Dunlap | Feb. 28, 1956 |
| 2,852,732 | Weiss | Sept. 16, 1958 |
| 2,869,001 | Welker | Jan. 13, 1959 |
| 2,877,394 | Kuhrt | Mar. 10, 1959 |

OTHER REFERENCES

"Photoconductivity Conference," a book published by John Wiley & Sons, N.Y., 1956, pgs. 553–555.

"Solid-State Physical Electronics" by van der Ziel, published by Prentice-Hall, Englewood Cliffs, N.J., 1957, pgs. 98–100.

"A New Method for the Measurement of Hall Coefficients," The Review of Scientific Instruments, vol. 21, issue 12, pp. 1028–1029, published date December 1950.

Annales De Radioelectricite, vol. 9, No. 38, October 1954, article by Grosvalet, pp. 360–365.

"Photoelectromagnetic Effect in Indium Arsenide," Physical Review, vol. 107, No. 2, July 15, 1957, pp. 374–378.